June 7, 1960 K. E. ZUBLIN ET AL 2,939,996

HIGH FREQUENCY ENERGY INTERCHANGE DEVICE

Filed July 30, 1958 2 Sheets-Sheet 1

KURT E. ZUBLIN &
ROBERT A. CRAIG
INVENTORS

BY Urban H. Faubion

ATTORNEY

June 7, 1960 K. E. ZUBLIN ET AL 2,939,996

HIGH FREQUENCY ENERGY INTERCHANGE DEVICE

Filed July 30, 1958 2 Sheets-Sheet 2

KURT E. ZUBLIN &
ROBERT A. CRAIG
INVENTORS

BY Urban H. Faubion
ATTORNEY

United States Patent Office 2,939,996

Patented June 7, 1960

2,939,996

HIGH FREQUENCY ENERGY INTERCHANGE DEVICE

Kurt E. Zublin and Robert A. Craig, Palo Alto, Calif., assignors to General Electric Company, a corporation of New York Filed July 30, 1958, Ser. No. 752,042

9 Claims. (Cl. 315—3.5)

This invention relates to high frequency energy interchange devices wherein the interchange of energy takes place between a stream of electrons and a radio frequency field to provide amplification and/or oscillations. More particularly, the invention relates to the class of high frequency energy interchange devices known as traveling wave tubes, which include an electron gun for producing a stream of electrons in an interaction region and a radio frequency circuit or transmission line for producing radio frequency fields in the region of interaction; and the invention has for one of its principal objects the provision of attenuators for such devices which allow improved performance and simplification of design and construction.

The present invention is particularly applicable to traveling wave tubes which have high average power handling capabilities and which utilize a slow wave radio frequency circuit of the helix or helix-derived type. It is intended that each of the terms "helix" (or "helical") and "helix-derived" be applied to radio frequency slow wave transmission lines in the manner commonly used in the traveling wave tube art. For example, the terms encompass wire and tape helices of the single and multifilar varieties and the cross-wound or contra-wound structures. The terms also encompass the circuit of the so-called ring-bar types. Such helix and helix-derived slow wave circuits are illustrated and described in many texts and articles. For example, see M. Chodorow and E. L. Chu, "Cross-Wound Twin Helices for Traveling-Wave Tubes," Journal of Applied Physics, vol. 26, pp. 33–34, January 1955; Samuel Sensiper, "Electromagnetic Wave Propagation on Helical Structures," Proceedings of the IRE, vol. 43, pp. 149–161, February 1955; and C. K. Birdsall and and T. E. Everhart, "Modified Contra-Wound Helix Circuits for High-Power Traveling-Wave Tubes," IRE Transactions on Electron Devices, vol. ED-3, no. 4, pp. 190–204, October 1956.

The design of traveling wave tubes requires a number of engineering compromises in operating characteristics and constructional features. For example, compromises must be made between the maximum usable gain, the frequency range of operation (bandwidth), the noise figure, and the size of components, i.e., length and diameter of the tube. One compromise which is nearly always necessary involves a compromise between loss in the slow wave circuit and gain of the tube. Any loss in the slow wave circuit tends to reduce the obtainable gain and efficiency in the tube. Consequently, it is desirable to use a low loss slow wave circuit to obtain high gain. However, a low loss slow wave circuit tends to support electromagnetic waves of certain frequencies which are reflected from the output of the device (backward waves). These unwanted reflections or electromagnetic waves are caused by discontinuities in impedance (mis-matches) along the slow wave structure and most commonly occur at the points where electromagnetic waves are introduced or abstracted from the slow wave structure, i.e., at the input and output coupler. Such reflections may severely limit the useful gain of the device and may even cause an amplifier to oscillate.

Transmission of reflected waves may be minimized by severing the slow wave circuit in one or more places to form one or more gaps or drift spaces along the slow wave circuit which interrupt reflected waves. Even using this expedient, however, it is necessary to prevent abrupt discontinuities at the ends of each severed portion of the slow wave structure; otherwise, reflections will occur at each gap along the structure. This is typically accomplished with broadband terminations on each side of a gap.

Such arrangements are used but do not allow any appreciable adjustment in the length of the helix portions during the manufacture of the device, therefore each individual tube must be custom made. Further, broadband terminations have required the use of tapered attenuators in which the signal to be absorbed is dissipated generally over an extended path rather than abruptly. Distribution of the attenuation over a substantial portion of the slow wave structure introduces very large loss in the forward gain, and consequently is not desirable in most applications.

The problem has been solved in part by providing attenuation in a tapered section near the middle of the tube by coating a part of the glass envelope with resistive material such as carbon. However, the attenuator generally needs to be long in terms of the length of the slow wave structure; for example, on the order of ten wavelengths long. Interaction between the electron stream and electromagnetic waves is substantially reduced over the entire region covered by such an attenuator. Thus a considerable length of the circuit is not effective to provide amplification.

In view of the problems associated with distributed attenuation, the desirability of providing a lumped or relatively short attenuator section has been recognized. However, it has been extremely difficult to achieve such results in practice. The problem has been solved for periodically loaded slow wave structures as described and claimed in a co-pending application, Serial No. 632,841, filed January 7, 1957, which is filed in the name of the present inventors, assigned to the assignee of the present invention, and given the title "Traveling Wave Tube Attenuators." The attenuators described and claimed in that application are applicable in some measure to all types of slow wave structures; however, it is not generally convenient to use such attenuators in helix or helix-derived slow wave structures where the electron stream is projected down the axis of the slow wave structure. This is true because best interaction is obtained when the electrons in the stream pass in very close proximity to the slow wave transmission line. Any attenuator inside a helix or helix-derived transmission line which is close enough to the turns of the helix to be an effective attenuator would interfere with the electron stream.

It is therefore an object of this invention to provide an attenuator for use with helical or helix-derived slow wave structures which eliminates the difficulties mentioned above.

One attempt to provide such an attenuator for helical slow wave structures has required a physical severing of the slow wave structure, the insertion of an enlarged disc of lossy material between the sections, and tapering the diameter of the helix to make an enlarged flat spiral on both sides of the lossy material. This arrangement suffers the disadvantage of enlarging the diameter of the tube substantially and consequently increasing the weight. This is particularly true when, as in most such traveling wave tubes, the electron stream is focused by a large solenoid which must surround the tube over substantially its entire length and provide a uniform longitudinal magnetic field along the axis of the device. If the diameter of the tube is enlarged, then the diameter of the solenoid must either be enlarged correspondingly or some other expedient devised to obtain the field. In either case, the construction is complicated by virtue of the use of the attenuator. If the diameter of the solenoid is increased, the number of turns required for the solenoid must be increased in order to provide a magnetic field of increased strength along the axis of the solenoid. In turn, a larger power supply is required to energize the larger solenoid. Furthermore, the position of the attenuator relative to the severed helix is fixed prior to placing the structure in the tube envelope. Since there is no means of adjusting the position of the attenuator relative to the ends of the slow wave circuit, performance of the tube can not be optimized.

Therefore, it is a further object of this invention to overcome such difficulties by providing a relatively thin attenuator for use with helix or helix-derived slow wave structures which can readily be moved along the length of the slow wave structure to a desired position.

A further object of this invention is to provide an attenuator of the type described which may also be utilized to support the slow wave structure of a traveling wave tube.

In carrying out the objects of the present invention, a traveling wave tube is provided which has a slow wave structure of a helical or helix-derived form and one or more attenuation members consisting of relative high loss material concentrated in a relatively short length which is adapted to surround the slow wave structure. The attenuator members are of such a form that their position along the slow wave structure may be adjusted and they may also be utilized as supports for the slow wave circuit.

The novel features which are believed to be characteristic of the invention are set forth in the appended claims. The invention itself, however, both as to its organization and method of operation, together with further objects and advantages thereof, may best be understood by reference to the following description taken in connection with the accompanying drawings in which:

Figure 1:
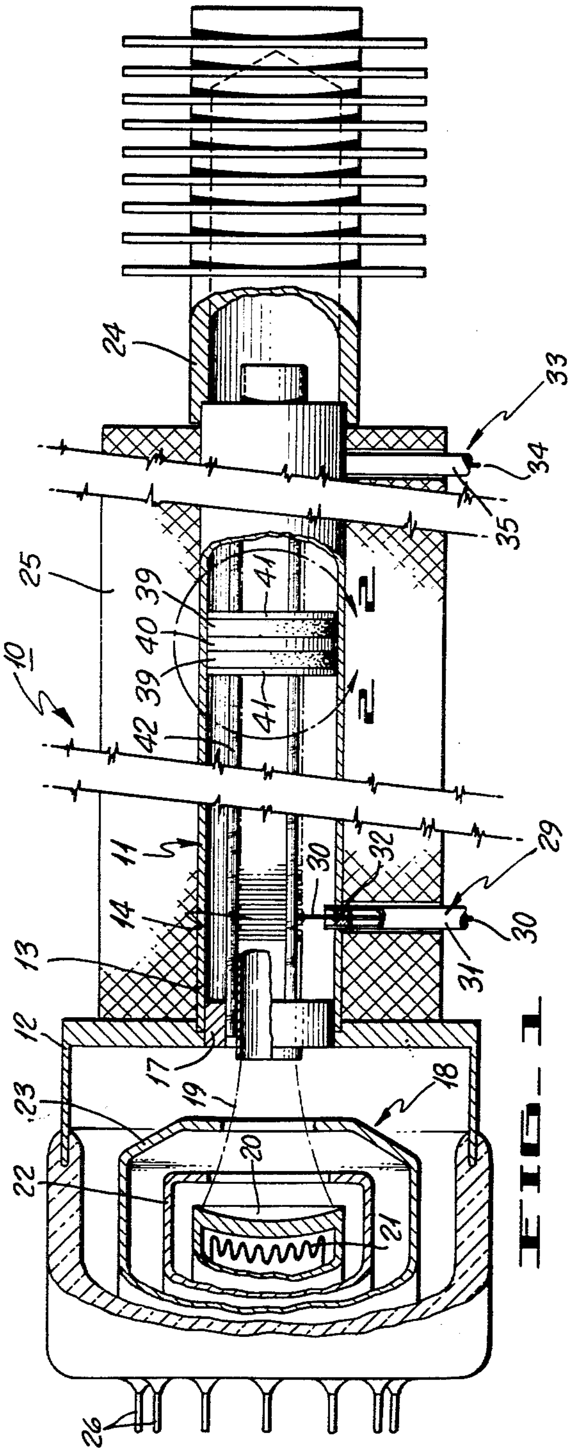
Figure 1 is a central, vertical, partially broken-away longitudinal section through a high frequency energy interchange device embodying one form of the present invention.

In Figure 1 of the drawings, a traveling wave tube 10 is illustrated. Traveling wave tube 10 is provided with an envelope 11 which is generally long and cylindrical. As illustrated, the envelope 11 has an enlarged cylindrical glass and metal portion 12 at one end and a smaller longer metallic cylindrical portion 13 forming the opposite end. The enlarged cylindrical portion 12 houses an electron stream producing gun 18 and the small slender cylindrical portion 13 houses the long helical main interaction transmission line 14. Thus the two principal interaction producing elements are enclosed in the envelope 11. That is, electrons are projected down the length of the slow wave circuit 14 by electron gun 18 in such a manner that they interact with electromagnetic waves propagated down the slow wave transmission line 14 to produce amplification. This phenomenon is described in more detail below.

Figure 3:
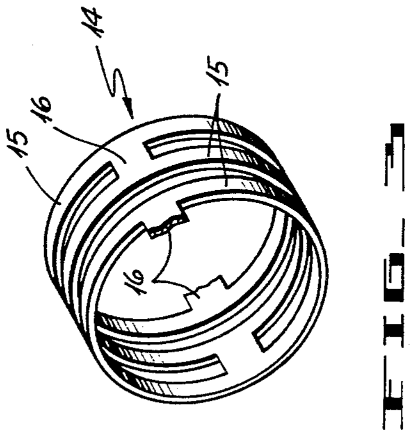
Figure 3 is a perspective view of a segment of the slow wave transmission line used in the device of Figure 1.

The metal and glass portions of the electron gun enclosing bulb 12 are sealed to form a unitary enclosure which will hold a vacuum. The metal front end of the gun enclosing bulb 12 is positioned coaxially with respect to the metal helix enclosing cylindrical portion 13 of the vacuum tube such as by brazing. The particular main transmission line 14 illustrated (best seen in Figures 1 and 3) is one of the helix-derived slow wave circuits which is a contra-wound helix of the type known as a ring-bar structure. The particular type of transmission line is called helix-derived since it does not conform to the strict technical definition of a helix and yet is a circuit which performs (electrically) like a contra-wound helix. The ring-bar circuit is formed by a series of identical coaxial rings 15 which are spaced apart in the axial direction. Each of the rings 15 is joined to the next succeeding ring with short bars 16 and each bar 16 is spaced around the periphery of the pair of rings 15 which it links 180° with respect to the preceding bar 16. The length of bars 16 is determined by the velocity of the electron stream and the frequency of the radio frequency wave in accordance with well known traveling wave tube helix-design principles as set forth in "Traveling Wave Tubes" by J. R. Pierce, Van Nostrand Company, Inc., New York, 1950. The principles of the invention are applicable to any type of helical slow wave structure but the ring-and-bar structure is illustrated since the invention was first used in connection with this structure.

The slow wave transmission line 14 is held in position in its enclosing cylinder 11 at both ends by cylindrical shorting and supporting members 17 (only gun end shown) and over its length by three heat conductive and electrically non-conducting support rods 42 spaced equidistant around the periphery of transmission line 14, extending over its full length, and supported in apertures in the end supporting members 17. The shorting and supporting members 17 are preferably conductive while the supporting rods 42 are of a dielectric material which readily dissipates heat but does not unduly load the circuit. One such material is sapphire. As is described more fully subsequently, the helix 14 as well as the supporting rods 42 are also supported by an attenuator assembly 36 positioned in the envelope 11.

A stream of electrons is produced and projected along the axis of the envelope 11 by the electron gun 18 as depicted by the broken lines 19 in Figure 1. The electrons which are formed into a stream are emitted from a cathode 20 in response to heat applied thereto by a heater member 21. As illustrated, the heater member 21 is a high resistance coil located near the emitting cathode button 20. The stream 19 is formed and projected along the longitudinal axis of the tube by a centrally apertured electron stream focusing electrode 22 and a centrally apertured electron stream accelerating anode 23. Since the elongated main slow wave transmission line 14 is positioned inside the slender portion 13 of the envelope with its axis coincident with the tube axis, the electron stream 19 is projected down the length of the tube in close proximity thereto, thus providing an interaction region along the axis of the tube. A collector anode 24 is positioned at the opposite or output end of the structure to dissipate residual energy in the stream. The collector anode 24 is provided with a series of annular cooling fins 26 therearound.

In order to prevent the space charge of the electrons from spreading them to such an extent that they pass out of the interaction region and intercept the slow wave transmission line 14, it is necessary to provide some focusing means. Focusing is provided in the device illustrated by producing a magnetic field axially along the structure. This is typically done by providing a long annular solenoid 25 which surrounds the entire tube along its length. To simplify the present drawing and description, the magnetic field producing solenoid 25 is only partially and schematically illustrated and its source of energizing potential is not shown. Further, the operating power source for the tube 10 is not shown since it is conventional and does not form a part of the present invention. The potentials on the electrodes of the electron gun are established by means of conductive leads or pins 26 which are brought out through the base 12 of the tube 10. The relative potentials applied to the various electrodes are established in accordance with well known gun design considerations (see J. R. Pierce "Theory and Design of Electron Beams," 2nd edition, 1954, Van Nostrand Co.).

A desired radio frequency electromagnetic wave is coupled or transferred onto the slow wave transmission line 14 by a coaxial transmission line 29 in such a manner that the transferred wave is propagated from the gun end of the tube toward the output or collector end. In order to accomplish this, the inner conductor 30 of the coaxial transmission line 29 is brought into the envelope 11 near the gun end of the tube and electrically connected with a bar 16 (cross-over point of two rings of the slow wave transmission line 14), and the outer conductor 31 is connected to ground or reference potential. In the embodiment illustrated, the outer conductor 31 is connected to the cylindrical metal helix enclosure 13. Since the coaxial transmission line 29 is brought into the vacuum tube through the outer wall, a dielectric vacuum tight seal or window 32 is provided between the inner and outer conductors to prevent tube leakage.

Radio frequency energy is abstracted from the tube 10 near the collector end by an output coaxial transmission line 33 which also extends out through the metal helix enclosure 13. The output coaxial transmission line 33 also has an inner conductor 34 which makes contact with a bar 16 or cross-over point of two rings 15 and an outer conductor or cable sheath 35 connected to the metallic helix enclosure 13 which is at ground or reference potential. Once again it is necessary to provide a dielectric seal or window between the inner and outer conductors 34 and 35 in order to prevent tube leakage. The details of the output connections and window are not shown since they are identical to the connection and window 32 for input transmission line 29.

The elements of the apparatus described thus far operate as a conventional traveling wave amplifier. That is to say, the electromagnetic waves introduced onto the helix 14 by the input transmission line 29 interact with the electrons in the electrons stream 19 to produce electron velocity modulation and consequently electron bunching. As the wave and stream travel along the length of the slow wave transmission line 14, the phenomenon reverses and the bunched stream induces fields and currents along the helix. The amplitude of the wave on the helix 14 grows exponentially until the stream becomes saturated because the stream gives up more energy to the helix 14 than it abstracts from it. However, unless the impedance match between the helix 14 is perfectly matched to the input and output coaxial transmission lines 29 and 33 over the full frequency range of interest, some of the amplified wave travels back down the helix and reinforces the input wave at certain frequencies. As a consequence, the amplifier tube 10 may be caused to oscillate at certain frequencies. For obvious reasons, oscillations are not desirable in an amplifier. Therefore, some means must be provided to reduce the backward transmission and eliminate the tendency to oscillate.

The backward wave transmission can be eliminated by providing some means to absorb or attenuate such waves.

Figure 4:
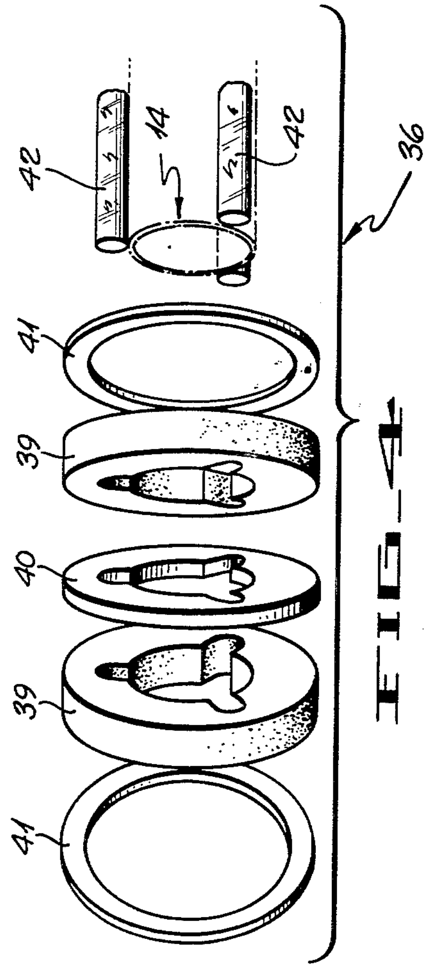
Figure 4 is an enlarged exploded view in perspective showing the attenuator assembly and matching members of Figure 1.

As illustrated, the necessary attenuation is provided in the traveling wave tube 10 by an attenuator assembly 36. The general configuration of the assembly, its position in the tube 10, and the manner in which it is used as a support for the slow wave circuit 14 may best be seen by referring to Figure 1. The components which comprise the attenuator assembly 36 are best illustrated in Figure 4.

From an inspection of Figure 1, it is seen that the attenuator assembly 36 is substantially cylindrical and is coaxially positioned around a portion of slow wave circuit 14 about midway along its length and inside the cylindrical helix enclosing portion of the envelope 11. Since the attenuator assembly occupies a relatively small proportion of the length of slow wave structure 14, that is, its thickness is very small in terms of the length of the slow wave circuit 14, it is considered a lumped attenuator. In the embodiment illustrated, the attenuator assembly covers approximately one circuit wave length in the frequency range of interest. In general, it may be said that the circuit wavelengths covered is one or less.

In view of the fact that the attenuator assembly 36 is thin in terms of circuit length, it does not reduce the forward gain of the tube 10 substantially and therefore allows maximum gain to be realized for the shortest tube length, other tube parameters being equal. Further, since the assembly 36 is thin, it has the advantage of facilitating location at some exact position for best operating efficiency, gain, etc. For example, it is found that the tube is most stable (least likely to oscillate) when the attenuator assembly 36 is located approximately mid-way along the length of the slow wave circuit. As the attenuator is moved toward the gun end of the tube, gain is reduced and as it is moved toward the collector end, efficiency is reduced. Therefore, the importance of having a relatively thin attenuator assembly, the position of which may easily be adjusted, is apparent.

The attenuator assembly 36 is supported and held in place by the three helix supporting insulator rods 42 which are projected through three apertures 46 which extend all the way through the attenuator assembly 36 and are equally spaced around its face. The insulator rods 42 are supported in a fixed position within the helix enclosing portion 13 of the tube envelope 11 and the attenuator assembly 36 is held on the insulator rods 42 in such a manner that its axial position can be adjusted. Once the desired position is reached, the attenuator assembly may be fixed. For example, it may be brazed to the insulator rods 42 or to the metal portion 13 of envelope 11.

The particular position of the attenuator assembly 36, adjacent the external surface of the slow wave structure, introduces loss in the region of radio frequency magnetic fields very close to the walls where high magnetic field densities exist and also in the regions of strong electric fields which normally extend between the turns of the slow wave structure and bow slightly outwardly. In this manner the loss is introduced in the most effective way.

As may best be seen from Figure 4, the attenuator assembly includes three similarly disc-shaped members (39 and 40) and two ring-shaped members 41. The center disc-shaped member 40 is made of a conductive material and it is surrounded by, or sandwiched between, the two disc-shaped lossy attenuator disc members 39. Several materials are known which can be used for the attenuator discs; for example, carbonized porous ceramics, lossy ceramics or any other materials whose properties can be controlled easily and which are stable in the vacuum. The outer two members 41 which are positioned on the outside of the attenuator assembly are conductive impedance matching members. These matching rings 41 are used to provide an impedance transition between the space surounding the slow wave circuit 14 and the attenuator and are shaped as required to give a good reflectionless impedance match. Since the attenuator assembly 36 is positioned snugly around the slow wave circuit 14, the attenuator disc members and the conductive isolating disc member which is sandwiched between them each has a centrally located aperture of such a diameter to fit snugly around the slow wave structure and an outer circumference which fits closely within the tube envelope. In addition, each of the discs is provided with three apertures 46 therethrough which apertures are aligned in the assembly to provide passages for the attenuator supporting dielectric rods 42 as described previously in connection with the entire assembly. The matching rings 41 have outer diameters which fit snugly within the helix enclosing envelope portion 13 and the entire assembly is preferably held together by means of an adhesive material placed between the surfaces of each of the members.

The attenuator discs 39 on each side of the center conductive disc 40 achieve an impedance match in the sections of the tube 10 on both sides of the attenuator 36. Since the attenuator assembly 36 is placed external to the slow wave circuit 14 and in intimate contact with the metal envelope portion 13, it is very easily cooled. The use of the matching rings 41 in front of the ceramic discs 39 and the centrally located conductive disc 40 between the two attenuator discs 39 also contribute to efficient cooling of the attenuator assembly.

The shape of the attenuator assembly 36 can be varied depending upon the configuration of the particular slow wave circuit and the tube envelope used. However, insertion of an attenuator along the slow wave structure disturbs the field distribution and therefore matching elements should be provided in front of the lossy attenuators regardless of the configuration selected. Further, it should be noted that it is not imperative that the center isolating conductive disc 40 or the lossy discs 39 fit snugly around the circuit 14 if coupling is desired between sections of the tube. But for complete attenuation of propagated electromagnetic waves, this arrangement is far superior. Additionally, cooling properties are best when the discs 39 and 40 make contact with the circuit 14 and the envelope.

The portion of the slow wave circuit 14 which is covered by the attenuator assembly 36 acts as a drift tube; that is to say, a circular wave guide which is beyond its cut-off frequency. The amount of decoupling between the two sections of the slow wave structure is determined by the length of the drift tube. Thus, using the particular attenuator assembly illustrated and described, the length of drift tube can easily be varied by varying the thickness of the attenuator disc 39 or the number of such attenuator discs used. This arrangement provides a nearly perfect severed helix type of operation.

In addition to using various configurations of the attenuator assembly 36, it is also apparent that the attenuation may be tapered in a radial direction rather than the usual axial direction if it is desirable to do so. Further, the general type of attenuator described may be used as a termination at the output end of the tube in the case where it is desirable to use the tube as a backward wave oscillator. However, the attenuator finds its most important application in the case of a high power traveling wave tube which acts as an amplifier.

Figure 2:
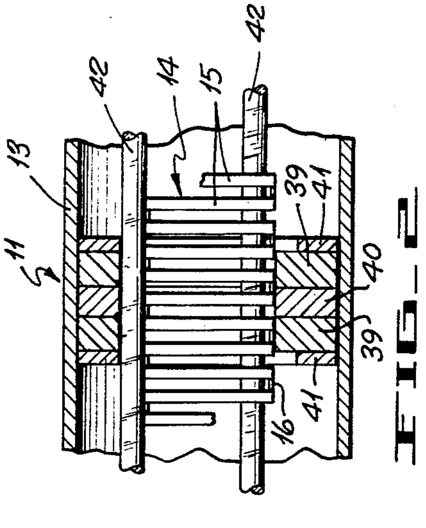
Figure 2 is an enlarged detail view of a portion of the apparatus illustrated in Figure 1 taken inside the section lines 2—2 of that figure.
Figure 6:
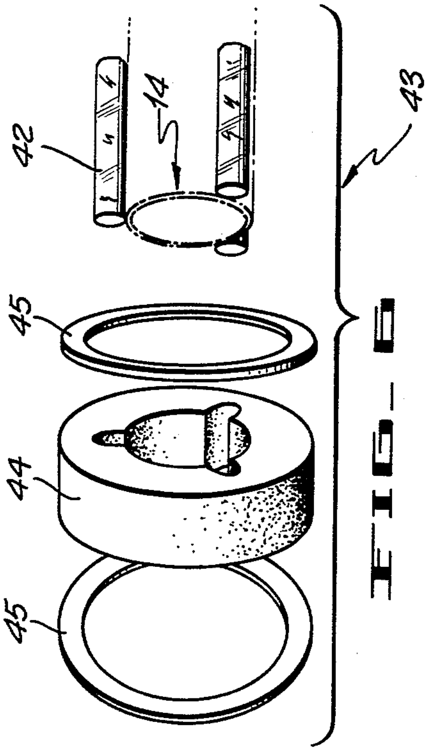
Figure 6 is an exploded perspective view of the attenuator assembly of Figure 4.
Figure 5:
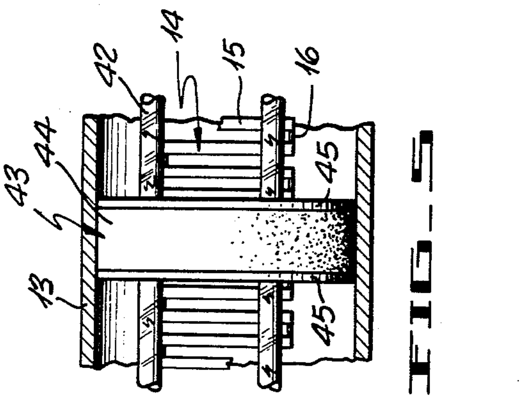
Figure 5 is a broken-away side elevation of a portion of a traveling wave tube showing another attenuator positioned in the tube of Figure 1.

The attenuator assembly 36 illustrated and described in connection with Figures 1, 2 and 4 is a preferred one since it provides such excellent cooling qualities and severed helix type operation for the traveling wave tube. However, other arrangements may be used. One such arrangement is illustrated in Figures 5 and 6 of the drawings. In these figures, the elements which correspond to the elements of Figures 1, 2 and 4 are given corresponding reference numerals to simplify the discussion and description as well as the drawings since the attenuator assembly 43 of Figures 5 and 6 could be substituted for attenuator assembly 36. In these figures it is seen that the attenuator assembly 43 utilizes a single attenuator assembly 43 utilizes a single attenuator disc 44 which in general occupies the same position in the traveling wave tube envelope as did the attenuator discs 39 described in connection with Figure 1. Further, the attenuator disc 44 has the same general configuration as discs 39 but is of necessity thicker since it must provide all of the attenuation necessary to prevent backward waves in the traveling wave tube. Once again, however, a pair of conductive impedance matching rings 45 are placed on opposite sides of the attenuator disc in order to provide a good impedance match and thereby prevent reflection from the surfaces of the attenuator disc 44.

In view of the foregoing comments, it is apparent that the objects of the invention have been carried out by providing an efficient attenuator which may be restricted to a confined region along a slow wave structure rather than covering a substantial length of the slow wave structure as is the usual case with distributed attenuators. This structure has the advantage of facilitating the exact location of the attenuator for best operating efficiency at some point along the length of the tube. Further, the design of the lossy section can be adapted to compensate for the introduced field perturbations resulting in a termination with a small reflection coefficient. In addition, the attenuator intercepts the radio frequency fields which are outside the slow wave structure. The attenuator provided is also applicable to other open slow wave structures which have substantial radio frequency fields outside the structure; for example, cross-wound helices or other helix-derived circuits. The attenuator element acts as a supporting element for the slow wave structure and its design provides the possibility of tapering the attenuation in a radial rather than axial direction. The attenuator can be designed easily to dissipate more radio frequency power than the circuit so the circuit becomes the limiting element in power handling capabilities instead of the attenuator.

While a particular embodiment of the invention has been described and illustrated, it will of course be understood that the invention is not limited thereto since many modifications both in the circuit arrangement and in the instrumentalities employed may be made. It is contemplated that the appended claims will cover any such modifications that fall within the true spirit and scope of the invention.

What we claim is new and desire to secure by Letters Patent of the United States is:

1. An attenuator assembly for use in a high frequency energy interchange device of the type having an elongated slow wave transmission line, said attenuator assembly including a substantially disc-shaped non-propagating attenuator of lossy material surrounding a portion of the slow wave transmission line and a pair of non-propagating impedance matching elements surrounding a portion of said slow wave transmission line on opposite sides of said attenuator assembly to match electromagnetic waves propagated along said slow wave transmission line to said attenuator discs said impedance matching element each comprising a conducting disc-shaped member.

2. In a high frequency energy interchange device having means for producing a stream of electrons and a slow wave transmission line arranged to surround the stream over substantially its entire length, a non-propagating attenuator assembly, said attenuator assembly including at least one non-propagating disc-shaped member of lossy material surrounding said slow wave structure and at least one non-propagating impedance matching element positioned around said slow wave structure and adjacent said disc-shaped attenuator in such a manner that one surface of said disc-shaped attenuator is in contact with said impedance matching element to receive and match propagated electromagnetic waves to said attenuator disc, said impedance matching element each comprising a conducting disc-shaped member.

3. The combination in a high frequency energy interchange device of an electron stream producing means and a collector electrode defining an electron stream path therebetween, a slow wave transmission line comprising a cylindrical walled helical conductor coaxial with and surrounding the electron stream path for propagating electromagnetic waves in the direction from said gun to said collector electrode, and a non-propagating attenuator assembly positioned around said slow wave transmission line and intermediate of said electron stream producing means and said collector to absorb electromagnetic waves propagating along said beam path from both ends of said device, said attenuator assembly including at least one substantially disc-shaped non-propagating attenuator of lossy material and a pair of non-propagating impedance matching elements positioned on opposite sides of said attenuator assembly and in contact therewith to match electromagnetic waves propagated along said slow wave transmission line to said attenuator disc, said impedance matching element each comprising a conducting disc-shaped member.

4. In an attenuator assembly for use in a high frequency energy interchange device of the type having an elongated slow wave transmission line, the combination of at least a pair of lossy disc-shaped attenuator members coaxially disposed around a portion of the slow wave structure, a conductive disc-shaped member surrounding a portion of the slow wave transmission line between and in intimate contact with said lossy disc-shaped attenuator members, said conductive disc-shaped member having substantially the same cross-section as said attenuator members, and a pair of impedance matching elements surrounding a portion of the slow wave transmission line and positioned on opposite sides of said attenuator assembly each in intimate contact with one of said pair of attenuator members to match electromagnetic waves propagated along the slow wave transmission line to said lossy disc members.

5. An energy interchange device for supporting an interchange of energy between electromagnetic waves and a stream of electrons including in combination a helical slow wave circuit, electron stream producing means for forming and directing an electron stream along a path inside said helical slow wave circuit, envelope means enclosing said stream producing means and said slow wave circuit, means to impress and abstract electromagnetic waves from said helical slow wave circuit, and an attenuator assembly positioned around a portion of said slow wave circuit and inside said envelope whereby said assembly is in intimate contact with each of said envelope and slow wave circuit, said attenuator assembly comprising at least a pair of disc-shaped attenuator members of lossy material surrounding a portion of the slow wave structure and in intimate contact with both said circuit and said envelope means, a disc-shaped conductive member of substantially the same cross-section as said attenuator disc members, and a pair of impedance matching rings positioned on opposite sides of said attenuator assembly to match electromagnetic waves propagated down said slow wave transmission line to said attenuator discs, said disc-shaped conductive member being positioned in intimate contact with both said disc-shaped attenuator members, said slow wave transmission line, and said envelope means, and said impedance matching rings each being in intimate contact with one of said attenuator members.

6. An energy interchange device for supporting an interchange of energy between electromagnetic waves and a stream of electrons including in combination a helical slow wave circuit, electron stream producing means for forming and directing an electron stream along a path inside said helical slow wave circuit, envelope means enclosing said stream producing means and said slow wave circuit, means to impress and abstract electromagnetic waves from said helical slow wave circuit, and a non-propagating attenuator assembly positioned around a portion of said slow wave circuit and inside said envelope whereby said assembly is in intimate contact with said envelope and said slow wave circuit, said attenuator assembly comprising at least one non-propagating disc-shaped attenuator member of lossy material surrounding a portion of the slow wave structure and in intimate contact with both said circuit and said envelope means, and a pair of non-propagating impedance matching elements positioned on opposite sides of said attenuator assembly and in intimate contact with the surface thereof to match electromagnetic waves propagated down said structure to said attenuator discs.

7. An energy interchange device for supporting an interchange of energy between electromagnetic waves and a stream of electrons including in combination a helical slow wave circuit, electron stream producing means for forming and directing an electron stream along a path inside said helical slow wave circuit, envelope means enclosing said stream producing means and said slow wave circuit, means to impress and abstract electromagnetic waves from said helical slow wave circuit, and an attenuator assembly having a thickness no greater than one circuit wavelength positioned around a portion of said slow wave circuit and inside said envelope whereby said assembly is in intimate contact with each of said envelope and slow wave circuit, said attenuator assembly comprising at least a pair of disc-shaped attenuator members of lossy material surrounding a portion of the slow wave structure and in intimate contact with both said circuit and said envelope means, a disc-shaped conductive member of substantially the same cross-section as said attenuator disc members, and a pair of impedance matching rings positioned on opposite sides of said attenuator assembly each in intimate contact with one of said attenuator disc members to match electromagnetic waves propagated down said slow wave transmission line to said attenuator discs, said disc-shaped conductive member being positioned in intimate contact with both said disc-shaped attenuator members, said slow wave transmission line, and said envelope means.

8. An energy interchange device for supporting an interchange of energy between electromagnetic waves and a stream of electrons including in combination a helical slow wave circuit, electron stream producing means for forming and directing an electron stream along a path inside said helical slow wave circuit, envelope means enclosing said stream producing means and said slow wave circuit, means to impress and abstract electromagnetic waves from said helical slow wave circuit, and an attenuator assembly positioned around a portion of said slow wave circuit and inside said envelope whereby said assembly is in intimate contact with each of said envelope and slow wave circuit, said attenuator assembly comprising at least a pair of disc-shaped attenuator members of lossy material surrounding a portion of the slow wave structure, a disc-shaped conductive member, and a pair of impedance matching rings positioned on opposite sides of said attenuator assembly each in intimate contact with one of said attenuator members to match electromagnetic waves propagated down said slow wave transmission line to said attenuator discs, said disc-shaped conductive member being positioned between and in intimate contact with both said disc-shaped attenuator members.

9. An energy interchange device for supporting an interchange of energy between electromagnetic waves and a stream of electrons including in combination a helical slow wave circuit, electron stream producing means for forming and directing an electron stream along a path inside said helical slow wave circuit, envelope means enclosing said stream producing means and said slow wave circuit, means to impress and abstract electromagnetic waves from said helical slow wave circuit, and a non-propagating attenuator assembly having a thickness no greater than one circuit wavelength positioned around a portion of said slow wave circuit and inside said envelope whereby said assembly is in intimate contact with each of said envelope and slow wave circuit, said attenuator assembly comprising at least one non-propagating disc-shaped attenuator member of lossy material surrounding a portion of the slow wave structure and in intimate contact with both said circuit and said envelope means, and a pair of non-propagating impedance matching elements positioned on opposite sides of said attenuator assembly in intimate contact with said attenuator member to match electromagnetic waves propagated down said structure to said attenuator discs.

References Cited in the file of this patent

UNITED STATES PATENTS

| | | |
|---|---|---|
| 2,611,101 | Wallauscheck | Sept. 16, 1952 |
| 2,771,565 | Bryant et al. | Nov. 20, 1956 |
| 2,811,673 | Kompfner | Oct. 29, 1957 |
| 2,845,570 | Klein | July 29, 1958 |

FOREIGN PATENTS

| | | |
|---|---|---|
| 660,660 | Great Britain | Nov. 7, 1951 |